Nov. 26, 1963   H. E. CHAPMAN   3,112,045
CONTAINERS FOR THE ASEPTIC STORAGE OF LIQUIDS
Filed Oct. 6, 1961   6 Sheets-Sheet 1

Inventor
By
Attorney

Nov. 26, 1963     H. E. CHAPMAN     3,112,045
CONTAINERS FOR THE ASEPTIC STORAGE OF LIQUIDS
Filed Oct. 6, 1961     6 Sheets-Sheet 2

Nov. 26, 1963     H. E. CHAPMAN     3,112,045
CONTAINERS FOR THE ASEPTIC STORAGE OF LIQUIDS
Filed Oct. 6, 1961     6 Sheets-Sheet 4

Nov. 26, 1963    H. E. CHAPMAN    3,112,045
CONTAINERS FOR THE ASEPTIC STORAGE OF LIQUIDS
Filed Oct. 6, 1961    6 Sheets-Sheet 5

Nov. 26, 1963    H. E. CHAPMAN    3,112,045
CONTAINERS FOR THE ASEPTIC STORAGE OF LIQUIDS
Filed Oct. 6, 1961    6 Sheets-Sheet 6

United States Patent Office 3,112,045
Patented Nov. 26, 1963

3,112,045
CONTAINERS FOR THE ASEPTIC STORAGE OF LIQUIDS
Harold Eric Chapman, 12 Denmark St., Birmingham 19, England
Filed Oct. 6, 1961, Ser. No. 143,337
Claims priority, application Great Britain Oct. 11, 1960
16 Claims. (Cl. 220—44)

This invention relates to bottles, jars and other containers for liquids, and especially such containers as are intended to be used for the aseptic storage of pharmaceutical injection and infusion liquids, for example, blood, blood plasma and other liquids used parenterally, including insulin, vaccines, sera, intravenous injections and small-dose injections; although the invention can also apply to containers for liquids generally (including oils, glycerine, fruit juices, milk and the like) where it is desirable that only sterile air shall enter the container (to replace the liquid) withdrawn.

An object of the present invention is to ensure that during storage of a liquid it will not be in contact with any substance that is liable, by such contact, to cause alteration in the nature of, or contamination of, the liquid. A further object is to provide a container for liquids having, in addition to the above advantage, closure means which effectively ensures that any air entering the container, during withdrawal of the liquid, in small successive quantities or otherwise, shall be sterile, so that the contents of the container will be maintained always in a sterile condition during storage and also so that the stored sterile liquid may be aseptically removed from the container.

A further object is to enable the container to be used in an automatic aseptic packing apparatus, the filling being effected under critical conditions without the intervention of the human element.

According to the invention, a container for the aseptic storage of liquids comprises a main body and a closure assembly at an end of the body, said assembly including a receptacle containing material which has germicidal properties and which can serve as an air filter and/or can be penetrated by a hypodermic needle or the like, said receptacle having at least one aperture in its base, and being associated with an adjacent apertured member located between the receptacle and the interior of the container body, said receptacle and adjacent member being relatively rotatable to cause the apertures to co-operate in order to control communication between the interior of the receptacle and the interior of the main container body.

The receptacle containing the said material may be rotatable in relation to the adjacent apertured member, the latter being stationary; or the receptacle may be stationary and the adjacent apertured member rotatable.

Also, according to the invention a container for the aseptic storage of liquids comprises a main body and a closure assembly at an end of the body, said assembly including a stationary base member having in it an aperture open to the interior of the body, and a circular receptacle rotatably mounted on the base member and containing material having germicidal properties, said receptacle having in it an aperture adapted, by the rotation of the said receptacle, to co-operate with the aperture in the base member in order to open and close the same, the arrangement being such that when said aperture in the base member is closed, the material in the rotatable receptacle is isolated from the interior of the container body.

Further, according to the invention, a container for the aseptic storage of liquids comprises a main body and a closure assembly at an end of said body, said assembly including a stationary base member having in it an aperture or apertures open to the interior of the body, and a circular receptacle rotatably mounted on the base member and containing needle-penetrable material having germicidal properties, said receptacle having in it an aperture or apertures for receiving a needle adapted, by the rotation of the said receptacle, to co-operate with the aperture or apertures in the base member in order to open and close the same for the passage of a needle into the container, the arrangement being such that when said apertures are closed the material in the rotatable receptacle is isolated from the interior of the container body.

The receptacle may contain an air-filtering germicidal-treated material, the said receptacle having in it, in addition to needle-receiving-apertures, a separate aperture for the passage of filtered air into the container, and an adjacent member having corresponding apertures to those in the receptacle, which corresponding apertures, in one position can register with those of the receptacle, whereas in another position they are closed, so that the air-filtering material in the receptacle is isolated from the interior of the container body.

The container may have at one end a closure device containing needle-penetrable material without apertures for the passage of air, and at the other end a closure device with air filtering material and air apertures in addition to apertures for the passage of a needle or the like.

The base member, when a rotatable receptacle is used, may be formed with a circular recess or chamber, the rotatable receptacle consisting of a circular tray closely fitting and being rotatable within the recess or chamber. The wall of said recess and the periphery of the tray may have mating conical surfaces.

The open top of the rotatable receptacle or tray may be covered by a stationary retaining ring secured to the base member, said retaining ring having in it apertures corresponding in position to those in the base member. The receptacle or tray may be coupled to a top rotatable operating cap having in it apertures corresponding in position to those in the receptacle. The said cap may have lugs passing through and being movable in arcuate slots in the retaining ring, and engaging notches in the receptacle or tray.

The receptacle or tray may have two concentric annular chambers one of which contains a puncturable wad and has needle-receiving apertures in the base, whilst the other chamber contains air-filtering material and has an aperture co-operating with an aperture in an adjacent member for the passage of filtered air into the main container body.

Or, in a modification, the receptacle or tray may contain a single wad of material which serves both as a needle-puncturable wad and as an air-filtering device, said wad comprising a central portion situated over needle-receiving apertures in the receptacle, and an outer portion of part-circular form having end shoulders, said outer portion being situated beneath an air inlet aperture so that air can pass through the material and out through the end shoulders into the receptacle or tray and thence through holes in the latter and into the container.

FIGURE 1 of the accompanying drawings is a vertical section through a container in accordance with the invention, the same being shown in its open condition for the extraction of the liquid contents.

Figure 1:
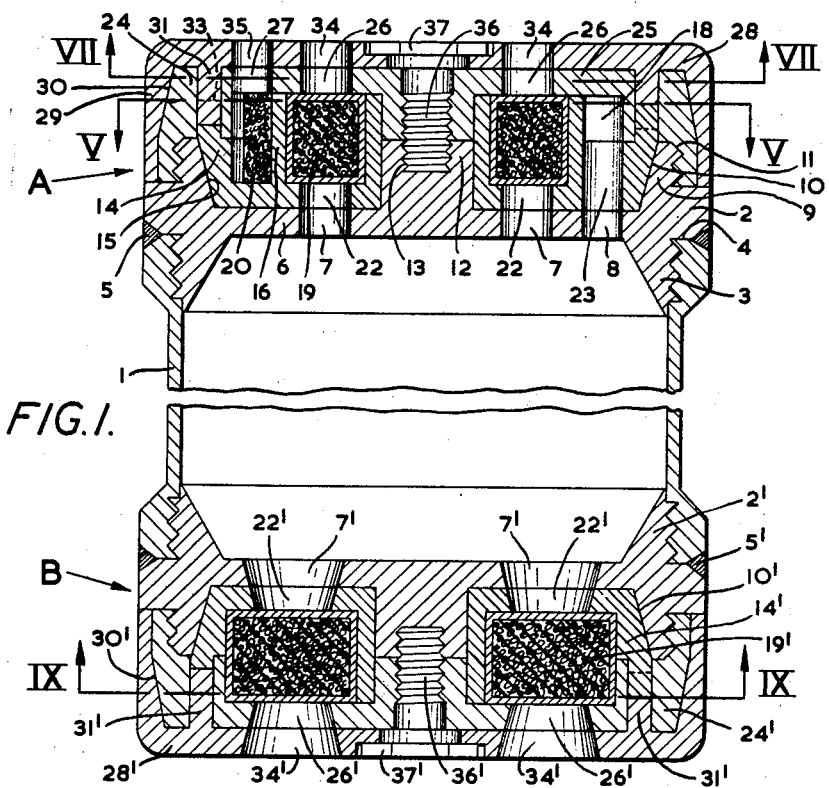

Referring to FIGURES 1 to 10 of the said drawings, these figures represent a container, constructed according to one form of the invention, intended for the aseptic storage of a supply of a pharmaceutical injection or infusion liquid, such as blood or other liquid intended to be used parenterally, including insulin, vaccines, sera, intravenous injections and small-dose injections.

The container is conveniently made from a plastic material and preferably from polypropylene or similar plastic which will withstand the action of dry heat or steam, during dry heat sterilisation at 150° C., or steam sterilisation up to 121° C., without distorting or softening. The container comprises a cylindrical body 1 the respective ends of which are fitted with a top air filtering and liquid filling closure assembly indicated generally at A, and with a bottom liquid-withdrawal closure assembly indicated generally at B.

The top closure assembly A comprises, first, a neck ring or base member 2 having an externally-threaded lower flange 3 screwed into the internally-threaded upper end of the body 1 up to a shoulder, and when screwed in place the neck-ring 2 is preferably welded to the body, as at 5. The said neck-ring 2 has a flat floor or base 6 in which are provided two larger circular holes 7, 7, at equal distances from the centre and a smaller circular hole 8, all three being in diametrical alignment. The ring 2 has an upstanding annular collar 9 formed with an interior conical surface 10, forming a recess in the top face, whilst the exterior is screw-threaded at 11; and said ring 2 also has a central upstanding boss 12 having in its face a screw-threaded hole 13, so that an annular chamber is formed between the collar 9 and the boss 12. Within this annular chamber is mounted a rotatable circular tray 14 having a perfectly flat bottom and around its lower part an exterior conical surface 15 closely engaging the conical surface 10 of the ring 2. The tray 14 has an upstanding annular flange 16 producing two concentric annular channels 17, 18 (see FIGURE 5). Closely fitted in the inner channel 17 is a circular puncturable wad 19 preferably made of polyurethane foam or similar material coated with a skin or outer covering such as a low-temperature-cured non-toxic silicone elastomer which is impermeable to liquids and is produced to an overall size such as to give an exact fit in the channel 17. The wad 19 is such as to be readily penetrable by a hypodermic needle, cannula or other penetrating device, and is treated so as to have germicidal and fungicidal properties. It is self-sealing after withdrawal of the needle, and it has a wiping effect upon the external surface of a traversing needle or the like, sufficient to sweep the surface of the latter free from contaminating germs or particles.

In one side of the outer channel 18 of the rotatable tray 14 two air filter units 20, 20, of aculate shape, are fitted, being separated by a space 21. These filter units may be composed of the same material as is the wad 19 with or without the skin or covering, provided with air inlet and outlet if with a skin or they may be of any suitable material treated with a germicidal substance having or providing a multiplicity of continuous and tortuous passages through which air may pass to the interior of the container.

The base of the inner channel 17 containing the wad 19 is provided with two diametrically-aligned holes 22, 22 which can be brought into alignment with the holes 7, 7, in the bottom of the neck-ring 2, whilst in the bottom of the channel 18, containing the filter units, there is a single hole 23 situated in diametric alignment with holes 22, 22, and adapted, when the holes 22, 22, are opposite the holes 7, 7, to register with the hole 8 in the neck-ring 2, as shown in FIGURE 1.

Figure 5:
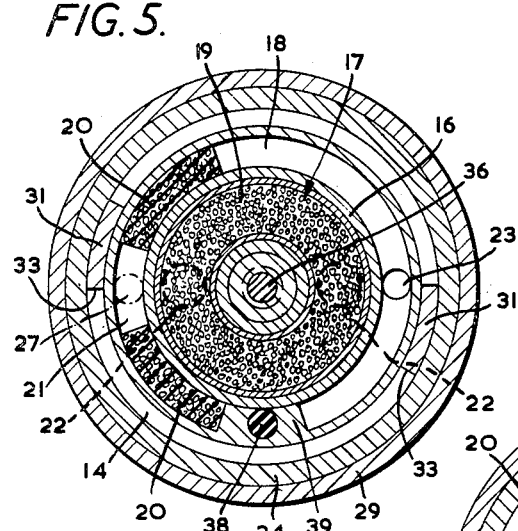
FIGURE 5 is a horizontal section on line V—V, FIGURE 1.

The tray 14 is held down, with the conical surfaces 10, 14, in close engagement, and with the wad 19 and filter units 20 retained in place, by means of a stationary retaining ring 24 screwed upon the collar 9 and having a flat top 25 bearing upon the tray 14. In this flat top 25 are two large holes 26, 26, which are vertically aligned permanently with the respective holes 7, 7, in the neck-ring. There is a third smaller hole 27 in the top 25, this being situated over the space 21 between the ends of the filter units 20 (FIGURE 5). The large holes 22, 26, when the holes 22 are aligned with the holes 7, permit of a hypodermic needle or a cannula being passed through the wad 19 and into the interior of the container, and the hole 27 is for the passage of air from the exterior into the container when the hole 23 is in register with hole 8, the air entering first into the space 21 between the filter units (FIGURE 5), thence passing through said filter units into the channel 18 and through holes 23, 8 into the container.

In order to rotate the tray 14 for the purpose of opening and closing the holes 7, 8, in the neck-ring and also in order to open and close the holes 26, 27, in the top 25 of ring 24, the latter is surmounted by a rotatable cap 28 having a skirt 29 provided interiorly with a conical surface closely mating with a conical exterior surface of the said ring 24, to form a cone joint at 30. The cap is provided on its underside with two or more depending lugs 31 which extend through arcuate slots 32 in the top of ring 24 (see FIGURE 7), which slots permit movement of the cap through 90°. The lugs 31 engage notches 33 in the peripheral flange of tray 14, whereby the cap is coupled to the tray to enable the latter to be turned by the rotation of the cap. The top of the latter has in it two large holes 34, 34 and a smaller hole 35, all in diametric alignment; and in one position of the cap, with the lugs 31 at one end of their slots 32, these holes register with the respective holes 26, 27, in the retaining ring 24, the holes 7, 22 and holes 8, 23, also being in register in this position; whereas when the cap is turned through 90°, to take the lugs 31 to the other ends of their slots 32, the rotation of the tray 14 causes the holes 7, 8, in the neck ring to be closed, and also the cap closes the holes 26, 27 in the retaining ring 24 as in FIGURE 2. The whole of the parts of the top closure assembly A are held together by a central screw 36 screwing into tapped holes in the boss 12 and in the retaining ring 24, and having a flat faceted and shouldered head 37 engaging a plain hole in the cap 28, said head being engageable by a box spanner.

The lower closure assembly B is of generally similar construction to the top assembly A, but it contains no air filter device. Thus it comprises a neck-ring 2' screwed into the lower end of the body 1 and welded thereto at 5'. Engaging within a conical seating 10' of said ring is a rotatable wad tray 14', of channel section containing an annular puncturable wad 19', similar to the wad 19 but of larger dimensions. In the base of tray 14' are holes 22' that can be moved into and out of register with holes 7' in the floor of ring 2'. A retaining ring 24' is screwed on to the neck ring 2' and has in it holes 26' axially aligned with the holes 7'. The tray 14' is rotated by a cap 28' having lugs 31' movable in arcuate slots in ring 24' and engaging notches in the tray, said cap forming a cone joint 30' with the ring 24' and having in its base holes 34' that are axially aligned with the holes 22' of the tray 14' and co-operate with the holes 26' for the opening and closing thereof. All the parts of the assembly are held together by screw 36' with head 37', of similar form to the top screw 36.

Figure 2:
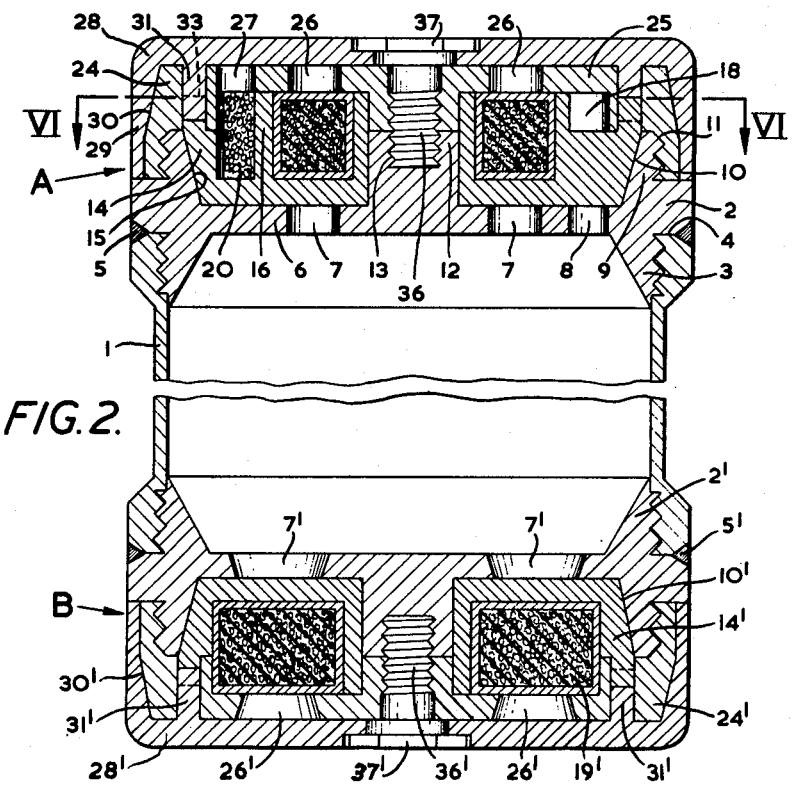
FIGURE 2 is a similar sectional view, but with the container completely closed.
Figure 3:
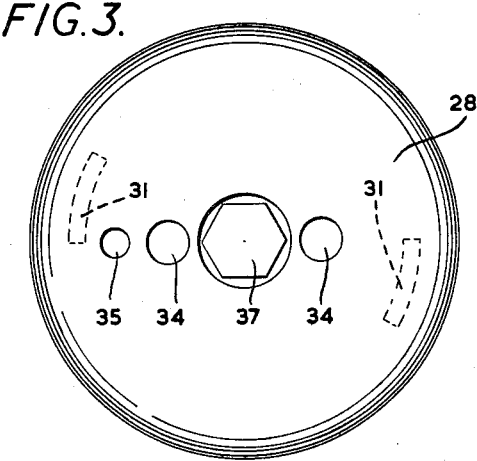
FIGURE 3 is a plan view of the container.
Figure 4:
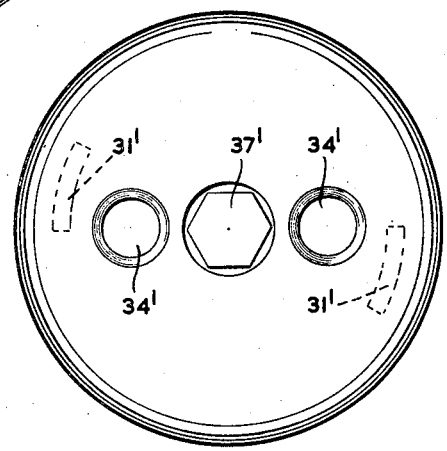
FIGURE 4 is an under side view.

In the position shown in FIGURE 1 the holes 34', 26', 22' and 7' are all in axial alignment to permit of the insertion of a hypodermic needle or a cannula through the wad 19'; but in FIGURE 2 the holes 26' and 7' are closed by the cap 28' and tray 14' respectively, so that the contents within the container are isolated from the wad 19' and cannot be polluted or contaminated thereby.

Figure 6:
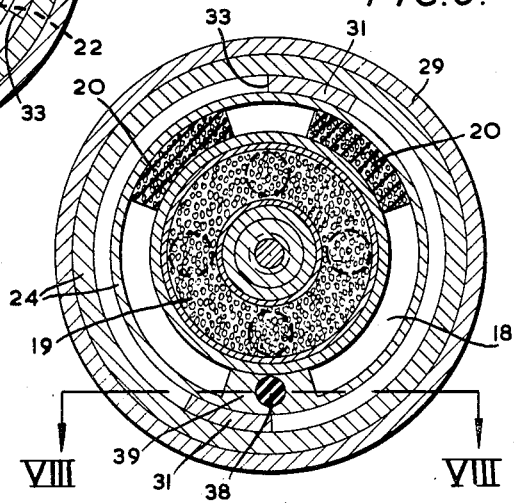
FIGURE 6 is a horizontal section on line VI—VI, FIGURE 2.
Figure 7:
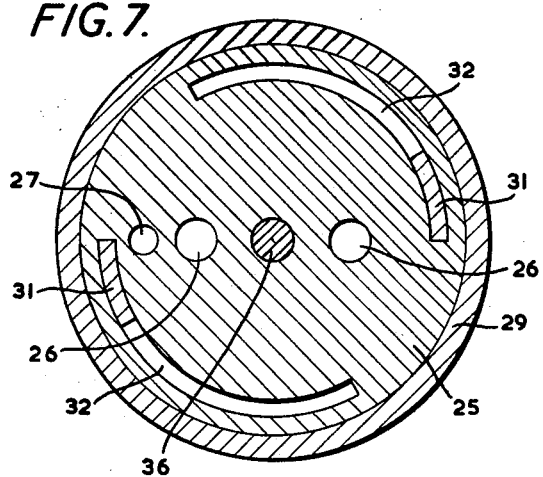
FIGURE 7 is a horizontal section on line VII—VII, FIGURE 1, looking upwards.
Figure 8:
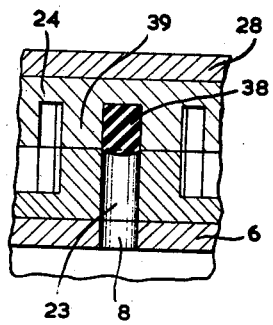
FIGURE 8 is a fragmentary cross-section on line VIII—VIII, FIGURE 6.
Figure 9:
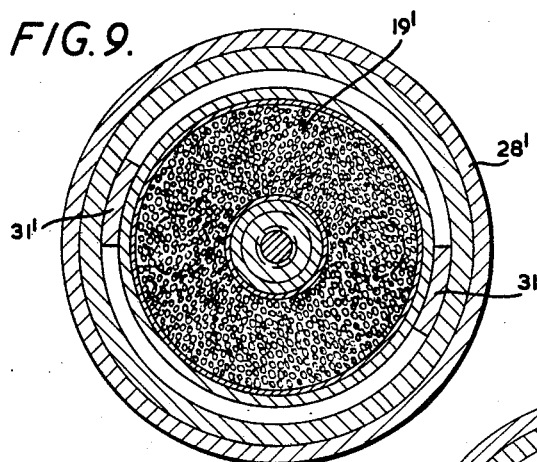
FIGURE 9 is a horizontal section on line IX—IX, FIGURE 1, looking upwards.
Figure 10:
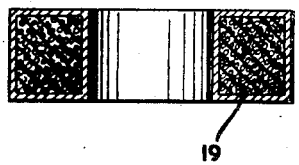
FIGURE 10 is a cross-section through the puncturable wad when removed from the container.

In a similar manner, when the upper assembly A is in the condition shown in FIGURE 2, the contents of the container are isolated both from the wad 19 and from the filter devices 20 as well as from the outside air; but as an extra precaution, to ensure that no unfiltered air, or any condensation water from chamber 18 can enter the container through holes 23 and 8, the hole 23 in the tray 14 is sealed, when the holes 8 are closed (FIGURE 2), by a silicone plug 38 fitted in a hole in a lug 39 on the underside of retaining ring 24, which lug has a convex lower end that closely seats itself in the top of hole 23, as shown in FIGURE 8 (see also FIGURE 6).

The container is filled with liquid through the assembly A, two cannulae being inserted through the two respective apertures 34, 26, with these apertures opened, as in FIGURE 1, the liquid being introduced under pressure through one cannula and the displaced air withdrawn through the other cannula. After filling has been completed, the cannulae are withdrawn, the apertures closed as in FIGURE 2, and finally the apertures 34 may be sealed.

When the liquid is to be withdrawn, as by a hypodermic needle or cannula, the cap 28' the lower closure assembly B is turned, so that the tray 14' is also turned until the openings 22' are aligned with the holes 7' and the apertures 26' are aligned with the holes 34', as in FIGURE 1. A needle may then be passed through the wad 19' into the container for the purpose of withdrawing a small quantity of the liquid. After removal of the needle or the like the apertures are closed as in FIGURE 2, so that the liquid in the container is isolated from the outside air and from the wads 19, 19' and cannot between withdrawal periods, come into contact with the liquid to contaminate the latter.

After the liquid is withdrawn, the cap 28 of the top closure is rotated to the fully-open position and then closed in order to allow air to pass from the outside through the filter and into the container in order to replace the liquid that has been removed.

The whole container, whether filled with liquid or empty, may be sterilised by dry heat at 150° C., or by steam, in an autoclave at a temperature up to about 120° C.; also, it may be subjected to freeze-drying at a temperature of minus 50° C., the container being exhausted of air by using two cannulae to produce a high vacuum. Or, the container may be filled with a suitable gas by the use of cannulae inserted through the wad.

The chamber 18 containing the filter units serves as a condensation chamber to prevent undesirable solutions of antiseptic present in the filter units from being sucked into the body of the container, thus altering the nature of the liquid contained therein. This could happen during the terminal part of the process of steam sterilisation.

Figure 12:
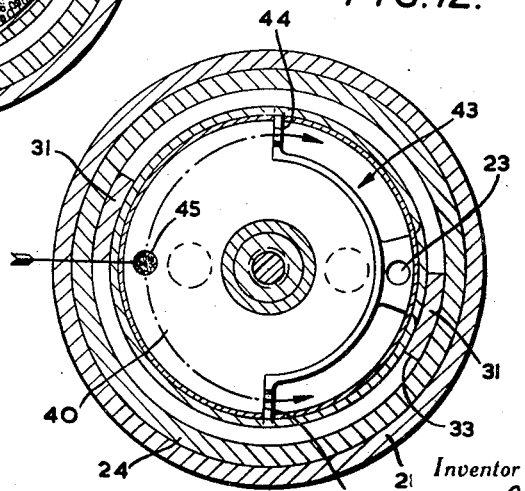
FIGURE 12 is a horizontal section on line XII—XII, FIGURE 11.
Figure 11:
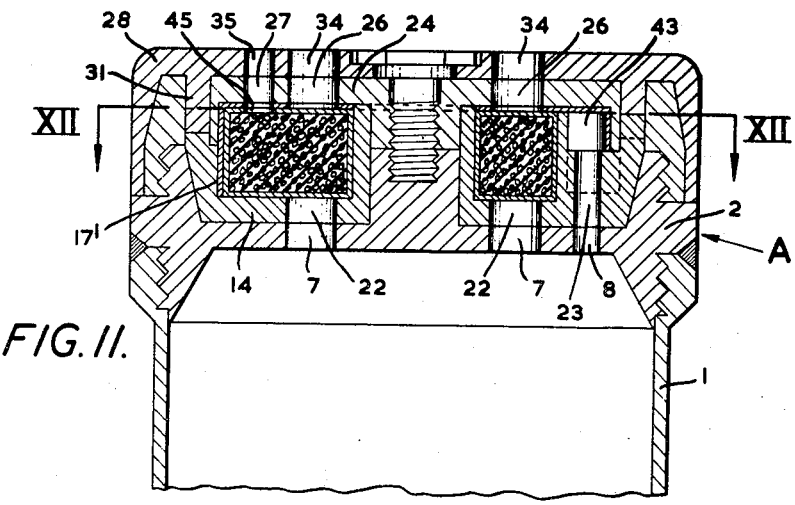
FIGURE 11 is a vertical cross-section through the upper part of a container according to a modified form of the invention.
Figure 13:
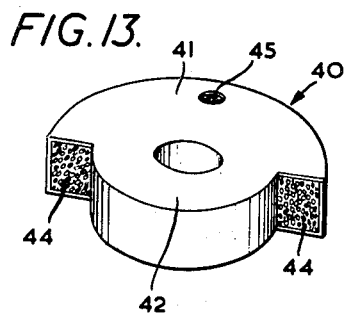
FIGURE 13 is a perspective view of the combined air filter and puncturable wad used in this modification.

Referring to the modification represented in FIGURES 11 to 13, this differs from the construction of FIGURES 1 to 10 only in respect of the top closure assembly A. Instead of separate puncturable wad and air filter units being provided, as in FIGURES 1 to 10, only a single wad is employed serving the double purpose of a puncturable wad and an air-filtering device. The general construction of the assembly A remains the same with neck-ring 2 screwed into the body 1, rotatable tray 14 operatively coupled to top rotatable cap 28 by lugs 31 movable in slots in the retaining ring 24 screwed on to the neck-ring 2; co-operable holes 7, 8, and 22, 23, being provided in the neck ring and tray 14 respectively, and also co-operative holes 26, 27, and 34, 35, in the retaining ring 24 and cap 28 respectively, exactly as in the form shown in FIGURES 1 to 10. However, there is only a single wide annular channel 17' in the tray 14, instead of the two channels 17, 18, in the other construction. In this channel 17' is placed a combined air filter and puncturable wad 40 made of the same germicidal material as is the wad 19 in FIGURES 1 to 10, but it is of the form shown more clearly in FIGURE 13. It includes a semi-circular main body part 41 of the full diameter of the annular channel 17', and a central semi-circular part 42 of smaller diameter, thus leaving a semi-circular condensation chamber 43 in the channel 17' between the radial shoulders 44 at the ends of the larger-diameter portion. The wad 40 is provided with a skin or outer covering as in the case of the wad 19 in FIGURES 1 to 10, but this skin does not extend over the said shoulders 44, at which the interior filtering material is left exposed. A hole 45 is formed in the top covering of the larger half of the wad 40, midway between the shoulders 44, being situated so that, by the rotation of the tray 14, it can be brought beneath the hole 27 in the retaining ring 24 when said hole has been aligned with the hole 35 in the cap 28. The hole 23 is in the bottom of the chamber 43 at a position diametrically opposite to the hole 45 in the wad. When the holes 35, 27, 45 and 8, 23, are in register as in FIGURE 11, air entering at 35 passes into the filter material through hole 45 whence it can travel in both directions to emerge through the exposed shoulders 44 into chamber 43 and thence through holes 23, 8 into the interior of the body 1 of the container. The air, in passing through the filtering material, is sterilised.

Figure 14:
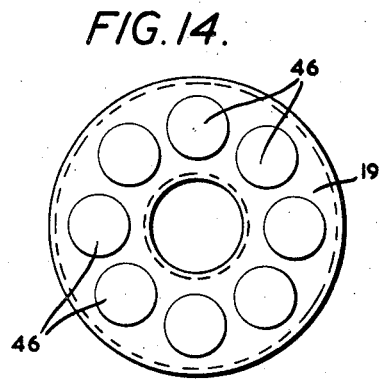
FIGURE 14 is a plan view of puncture-area indications.

As shown in FIGURE 14, the puncturable wad 19 as used in the construction of FIGURES 1 to 10, may have in its top face a circular series of markings 46 to indicate alternative pairs of puncture areas, so that as two opposite puncture areas become worn after repeated insertions of a needle or cannula, the wad can be re-positioned in the tray 14 to bring another pair of puncture areas into use.

Figure 15:
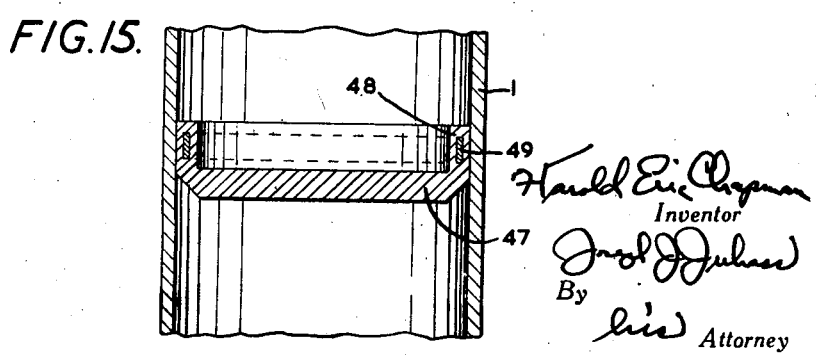
FIGURE 15 is a vertical section showing another modification.

Another modification is shown in FIGURE 15. In this case the body 1 of the container may have top and bottom closure assemblies as in FIGURES 1 to 10 or in FIGURES 11 to 13, but in order to prevent direct contact between air admitted into the container and the contents of the container, the air and contents are separated by a free piston 47 made of a material having a low co-efficient of friction and which will not have any deleterious action on the contents of the container. In order to ensure a watertight fitting within the container, the piston has a flexible flange 48, in which an expansile spring 49 is enclosed tending to expand the flange against the wall of the container. This device is of special importance in those cases where the liquid in the container is subject to oxidation changes.

In all forms the walls of the container are preferably made as thin as possible, and, if necessary, a central rod or distance member may hold apart the top and bottom closure assemblies, thereby relieving the thin walls from forces tending to buckle them. The walls may be transparent and the central rod, if used, may be calibrated to show the height of the liquid. The internal surface of the container may be treated with a silicone fluid.

In large containers a relief valve may be embodied in a central plug, fitted in the air-filter cap assembly, in order to relieve internal air pressure.

Various other modifications are envisaged within the scope of the invention. For example, the neck-rings 2, 2' in FIGURES 1 to 10, may be integral with the body 1, the latter being made in two transverse halves, joined together, by welding, at the middle of the container.

Also, a closure assembly may be provided at one end only, for example, the assembly A of FIGURES 1 and 2, or that shown in FIGURE 11.

There may be only one set of apertures 7, 22, 26, 34 in the top assembly A of FIGURES 1 to 10, or in FIGURE 11, instead of the two sets shown; and only one set of apertures 7', 22', 26' and 34' in the assembly B.

An air filter only may be provided at one end of the container, without apertures and wad for receiving a puncturing device, such apertures and wad being provided at the other end only.

Instead of air being admitted into the container through the filter, any suitable gas may be so admitted, and the use of the term "air" in this specification and claims is intended to include any such gas.

According to a still further modification a receptacle or tray corresponding to tray 14 or 14' and containing the filtering and needle-penetrable material, may be stationary, being suitably attached to or carried by the neck-ring 2 or 2', and being closed at the top by an apertured fixed lid or cover to form a box. Respectively above and below this box-like receptacle are two rotatable apertured plates, the lower plate being between the receptacle and the neck-ring 2 or 2', and the upper plate being in the form of a cap, such as 28 or 28', with air and needle-receiving holes or needle-receiving holes only, similar holes in the apertured fixed lid of the receptacle and in the base of the tray and in the lower plate. The two rotatable plates are connected together by a central rod or sleeve or otherwise so that by turning the top plate both plates turn together and can thereby place the needle-receiving holes in or out of alignment, and also open and close the air inlet apertures, in the case of assembly A, as described in connection with the device in FIGURES 1 to 10.

I claim:

1. A container for the aseptic storage of liquids comprising a main body and a closure assembly at an end of the body, said assembly including a receptacle containing material which has germicidal properties, said receptacle having at least one aperture in its base, and being associated with an adjacent apertured member located between the receptacle and the interior of the container body, said receptacle and adjacent member being relatively rotatable to cause the apertures to co-operate in order to control communication between the interior of the receptacle and the interior of the main container body.

2. A container as claimed in claim 1, having a closure assembly at one end in which the receptacle contains a needle-penetrable material and has in it an aperture for receiving a needle but without permitting the passage of filtered air, whereas at the other end the container has a closure assembly with air-filtering material and air-passage apertures as well as needle-receiving apertures.

3. A container according to claim 1 wherein the receptacle containing the germicidal material is stationary, and has holes in top and bottom; and co-operating with said holes are holes in two rotatable and coupled-together plates adapted, by their rotation, to place the material in said receptacle in communication with the interior of the container or to isolate said material from the interior of the container.

4. A container as claimed in claim 1 in which the receptacle containing the germicidal material has in it needle-receiving apertures and filtered-air apertures, the adjacent relatively-rotatable apertured member having corresponding apertures so that in one relative position of the said members the apertures in the receptacle are in registering open relation to said cooperating apertures in the relatively rotatable member and in another position they are closed.

5. A container as claimed in claim 4, wherein the receptacle contains a single wad of material which serves both as a needle-puncturable wad and as an air-filtering device, said wad comprising a central portion situated over needle-receiving apertures in the receptacle, and an outer portion of part-circular form having end shoulders, said outer portion being situated beneath an air inlet aperture so that air can pass through the material and out through the end shoulders into the receptacle and thence through holes in the latter and into the container.

6. A container as claimed in claim 4, wherein the receptacle has two concentric annular chambers one of which contains a puncturable wad and has needle-receiving apertures in the base, whilst the other chamber contains air-filtering material and has in the bottom an aperture for the passage of filtered air into the main container body.

7. A container as claimed in claim 6, wherein the filtering material occupies only a portion of the circumferential length of the second-named chamber, the remainder of said chamber serving as a condensation chamber and having an air aperture in its bottom for the passage of filtered air.

8. A container as claimed in claim 7, wherein two filter units are arranged in spaced endwise relation in the annular chamber, the space between opposed ends communicating with an air inlet aperture so that the entering air can pass through the two filter units, in opposite circumferential directions, into the condensation chamber.

9. A container for the aceptic storage of liquids comprising a main body and a closure assembly at an end of the body, said assembly including a stationary base member having in it an aperture open to the interior of the body, and a circular receptacle rotatably mounted on the base member and containing material having germicidal properties, said receptacle having in its base an aperture adapted, by the rotation of the said receptacle, to co-operate with the aperture in the base member in order to open and close the same, the arrangement being such that when said aperture in the base member is closed, the material in the rotatable receptacle is isolated from the interior of the container body.

10. A container as claimed in claim 9, wherein the top of the receptacle containing the germicidal material is closed by a stationary retaining ring having in it apertures corresponding in position to those in the base member.

11. A container as claimed in claim 9, wherein the top of the rotatable receptacle containing the germicidal material is closed by a stationary retaining member having in it apertures corresponding to those in the base member, and a top rotatable upper member superimposed on said retaining member, said upper member being coupled to the rotatable receptacle and having in it apertures cooperable with those in the stationary retaining member, so that the material in the said receptacle may be isolated both from the interior of the container and from the outside atmosphere.

12. A container as claimed in claim 9, wherein the rotatable receptacle is coupled to a top rotatable operating cap having in it apertures corresponding in position to those in the receptacle.

13. A container as claimed in claim 12, having a stationary retaining ring closing the top of the rotatable receptacle, and wherein the rotatable cap is coupled to the rotatable receptacle by means of depending lugs on the cap passing through and being movable in arcuate slots in the retaining ring and engaging notches in the rotatable receptacle.

14. A container as claimed in claim 9, wherein the base member is formed with a circular recess, and the rotatable receptacle consists of a circular tray closely fitting and rotatable within the recess.

15. A container as claimed in claim 14, wherein the interior wall of the recess in the base member, and exterior of the circular tray, have conical mating surfaces.

16. A container for the aseptic storage of liquids comprising a main body and a closure assembly at an end of of said body, said assembly including a stationary base member having in it at least one aperture open to the interior of the body, and a circular receptacle rotatably mounted on the base member and containing needle-penetrable material having germicidal properties, said receptacle having in its base at least one aperture for receiving a needle adapted, by the rotation of the said receptacle, to co-operate with the aperture in the base member in order to open and close the same for the passage of a needle into the container, the arrangement being such that when said apertures are closed the material in the rotatable receptacle is isolated from the interior of the container body.

References Cited in the file of this patent
UNITED STATES PATENTS

| | | |
|---|---|---|
| 2,061,958 | Chapman | Nov. 24, 1936 |
| 2,186,908 | Page et al. | Jan. 9, 1940 |
| 2,780,349 | Tornberg | Feb. 5, 1957 |
| 2,835,377 | May et al. | May 20, 1958 |

FOREIGN PATENTS

| | | |
|---|---|---|
| 797,811 | Great Britain | July 9, 1958 |